US007900155B2

(12) United States Patent
Sauermann (10) Patent No.: US 7,900,155 B2
(45) Date of Patent: Mar. 1, 2011

(54) SYSTEM AND METHOD FOR PROVIDING INFORMATION ABOUT AN OPERATION'S APPLICABILITY TO AN ITEM

(75) Inventor: Volker Sauermann, Heidelberg (DE)

(73) Assignee: SAP AG, Walldorf (DE)

( * ) Notice: Subject to any disclaimer, the term of this patent is extended or adjusted under 35 U.S.C. 154(b) by 1893 days.

(21) Appl. No.: 10/919,749

(22) Filed: Aug. 16, 2004

(65) Prior Publication Data

US 2006/0036477 A1 Feb. 16, 2006

(51) Int. Cl.
*G06F 3/048* (2006.01)
(52) U.S. Cl. .................. 715/767; 715/212; 715/227; 715/823; 715/824; 715/825
(58) Field of Classification Search ......... 715/212–220, 715/227, 228, 767, 823–825
See application file for complete search history.

(56) References Cited

U.S. PATENT DOCUMENTS 6,184,860 B1 * 2/2001 Yamakawa .................. 715/823

| 6,232,539 | B1 * | 5/2001 | Looney et al. ............... 84/609 |
| 6,353,452 | B1 * | 3/2002 | Hamada et al. ............. 715/825 |
| 6,856,332 | B2 * | 2/2005 | Kim .......................... 715/810 |
| 6,931,597 | B1 * | 8/2005 | Prakash ...................... 715/741 |
| 6,968,510 | B2 * | 11/2005 | Yokota ....................... 715/824 |
| 7,022,905 | B1 * | 4/2006 | Hinman et al. ............... 84/609 |
| 7,103,853 | B1 * | 9/2006 | Patil .......................... 715/824 |
| 7,136,861 | B1 * | 11/2006 | Sinclair et al. ............. 707/101 |
| 7,279,629 | B2 * | 10/2007 | Hinman et al. ............... 84/615 |
| 7,290,219 | B2 * | 10/2007 | Boyles et al. ............... 715/810 |
| 7,334,185 | B2 * | 2/2008 | Wicks ........................ 715/209 |
| 7,587,365 | B2 * | 9/2009 | Malik et al. .................. 705/40 |
| 2003/0110174 | A1 * | 6/2003 | Matsuzuki .................. 707/100 |
| 2004/0080545 | A1 * | 4/2004 | Kobal et al. ................. 345/824 |
| 2005/0114305 | A1 * | 5/2005 | Haynes et al. ................. 707/3 |

* cited by examiner

*Primary Examiner*—Weilun Lo
*Assistant Examiner*—Eric Wiener
(74) *Attorney, Agent, or Firm*—Kenyon & Kenyon LLP (57) ABSTRACT

A system and method for providing information about an operation's applicability to an item. A processor may provide a list of selectable items in a display area and may provide for each of the listed items, in response to receiving a command to perform an operation on selected items of the display area, an indication of a reason for the operation's applicability or inapplicability to the item.

31 Claims, 9 Drawing Sheets

SYSTEM AND METHOD FOR PROVIDING INFORMATION ABOUT AN OPERATION'S APPLICABILITY TO AN ITEM

BACKGROUND

A computer application may include executable code for performing operations on arbitrary items, e.g., data elements. Data elements may be represented in any number of ways and may include runtime objects, development objects, structures, files, databases, program structures themselves including source code, object code, binary code, etc., or any other entity for representing information. The items may be selected. Selected items may be manipulated by the operations. For example, a computer application may perform an operation upon a data file, i.e. the item, in which the file is deleted.

The computer application may provide a list of the items that can be selected for manipulation, e.g., by performance of an operation. For example, the computer application may employ a graphical user interface (GUI) to display within a main window of the GUI the list of items. The list may be presented in a table, and may include various columns to provide to a user information about the listed items. For example, each column may represent a particular category of information about the listed items. Each category may represent, e.g., a particular attribute of the item, e.g., item name, date of creation, and/or any type of information conventionally listed for each item in a particular computer application. Rows of a column may each correspond to one item. A particular row of a particular column may thereby convey information of the particular column's category with respect to the item that corresponds to the particular row.

For a list of items displayed within a window, the computer application may provide a set of operations to be performed, e.g., upon an occurrence of an event or upon user instruction. For example, a user may select all or some of the listed items and may instruct the computer application to perform an operation upon the selected items. Upon receiving the instruction, the computer application may perform the operation upon the selected items.

Typically for a particular item, only a restricted subset of operations may be applied. For example, consider an object with a number of overloaded methods and an inherited class that includes a number of additional methods. Runtime objects instantiated from the inherited class enjoy the availability of the additional methods, while runtime objects of the base class do not. As another example, a file structure may be associated certain read/write/executable permissions. Thus, the read, write and execute operations may only be applied to certain files with respect to particular users. Performance of an operation may be limited to particular items for any number of reasons. For example, the structure of a data element may inherently prohibit performance of a particular operation upon the data element, such as where performance of a mathematical operation is attempted upon a string. Restrictions on performance of an operation may be imposed, e.g., by an operating system, a computer application, etc. Within the context of this discussion, a parameter is a condition upon which performance of an operation is based.

For example, a computer application may condition performance of an operation upon conformance of an item to one or more predetermined parameters. The computer application may therefore perform the operation upon only those of the selected items that conform to the predetermined parameters. For example, a user may select 100 items of a list of items. The user may input an instruction to perform an operation for or upon the 100 items. The computer application may determine that only 70 of the selected items conform to predetermined parameters for performance of the operation. The computer application may therefore perform the operation for or upon only those 70 items that conform to the predetermined parameters.

It is conventional for the computer application to inform the user of the subset of selected items that conforms to the predetermined parameters and upon which the operation can be performed. For example, it is conventional to provide the user with a sub-window in which the 70 items are listed. The user may then choose whether to go forward with the operation. However, to ascertain how the list of the 70 items relates to the list of items displayed in the main window, the user must perform a line-by-line comparison of the two lists. Furthermore, the list does not identify the items that do not conform to the predetermined parameters. Furthermore, the user is not informed of the reason the operation is not performed on a particular item. For example, performance of an operation may be conditioned upon an item's conformance to two parameters. Thus, when an operation is not performed upon an item, the user does not know to which of the parameters the item does not conform.

In the alternative, it is also conventional to display a sub-window in which is displayed a message indicating that the operation can be performed upon only those of the selected items that conform to particular parameters. The message may identify the parameters. The user may then choose whether to go forward with the operation. After performance of the operation, the computer application may display in the message sub-window or in a different sub-window a list of the 70 items upon which the operation has been performed. In the alternative, it is also conventional for the computer application to display in the sub-window a list of all 100 selected items and include next to each listed item a mark that indicates whether or not the operation has been performed upon the item. However, even according to these alternative ways, to ascertain how the list of the 70 or 100 items relates to the list of items displayed in the main window (which may include more than the selected 100 items), the user must perform a line-by-line comparison of the two lists. Furthermore, the user is not informed of the reason the operation was not performed on a particular item. For example, the list displayed in the sub-window does not indicate whether the items excluded from the operation failed to meet the required parameters, or whether the operation was not performed due to another reason.

Accordingly, there is a need in the art for a system and method for presenting to a user information regarding which of the listed items conforms to the predetermined parameters for performance of an operation, and the particular parameters to which a particular item does not conform, such that the user can readily relate the information to the list of items.

DETAILED DESCRIPTION

Embodiments of the present invention generally relate to a computer system that provides a user with information regarding the applicability of an operation to listed items in response to a command to perform the operation. The embodiments particularly, though not exclusively, relate to operations and items of an administration tool of a search engine.

For a parameter upon which an operation to be performed may be conditioned, the computer system may indicate whether listed items upon which the operation may be performed conform to the parameter. The items may be listed in any conventional manner. For example, the items may be presented in a text document as a series of items. Alternatively, they may be tabularly presented in a table. To indicate an operation's applicability to the items, the computer system may include an applicability comment or mark that is next to or otherwise associated with each of the items. For example, the computer system may display next to each item a tag that corresponds to the parameter and that may indicate the item's conformance to the parameter. Alternatively, the computer system may display a flag column in a table in which the items may be listed. The flag column may correspond to the parameter. Data in the flag column and a color of the data may indicate which of the listed items conform and which of the listed items do not conform to the parameter. The computer system may also indicate the reason why a selected operation will be or will not be performed upon the items. For example, in response to a selection of an operation, the computer system may highlight the tags or the flag column that corresponds to the parameter. The computer system may display and highlight the tags and/or flag columns within the displayed original list of items for which the operation selection was made.

If more than one operation may be selected for performance upon or for the listed items, and if each operation's performance is conditioned upon conformance to one or more parameters, the computer system may display a tag, flag column, and/or some other comment for each of the parameters. Upon selection of one of the operations, the computer system may indicate the particular reason why the selected operation may or may not be performed upon the items. For example, the computer system may indicate which of the tags, flag columns, and/or other comments are relevant to the selected operation, e.g., by highlighting the relevant tags, flag columns, and/or other comments.

Figure 1:
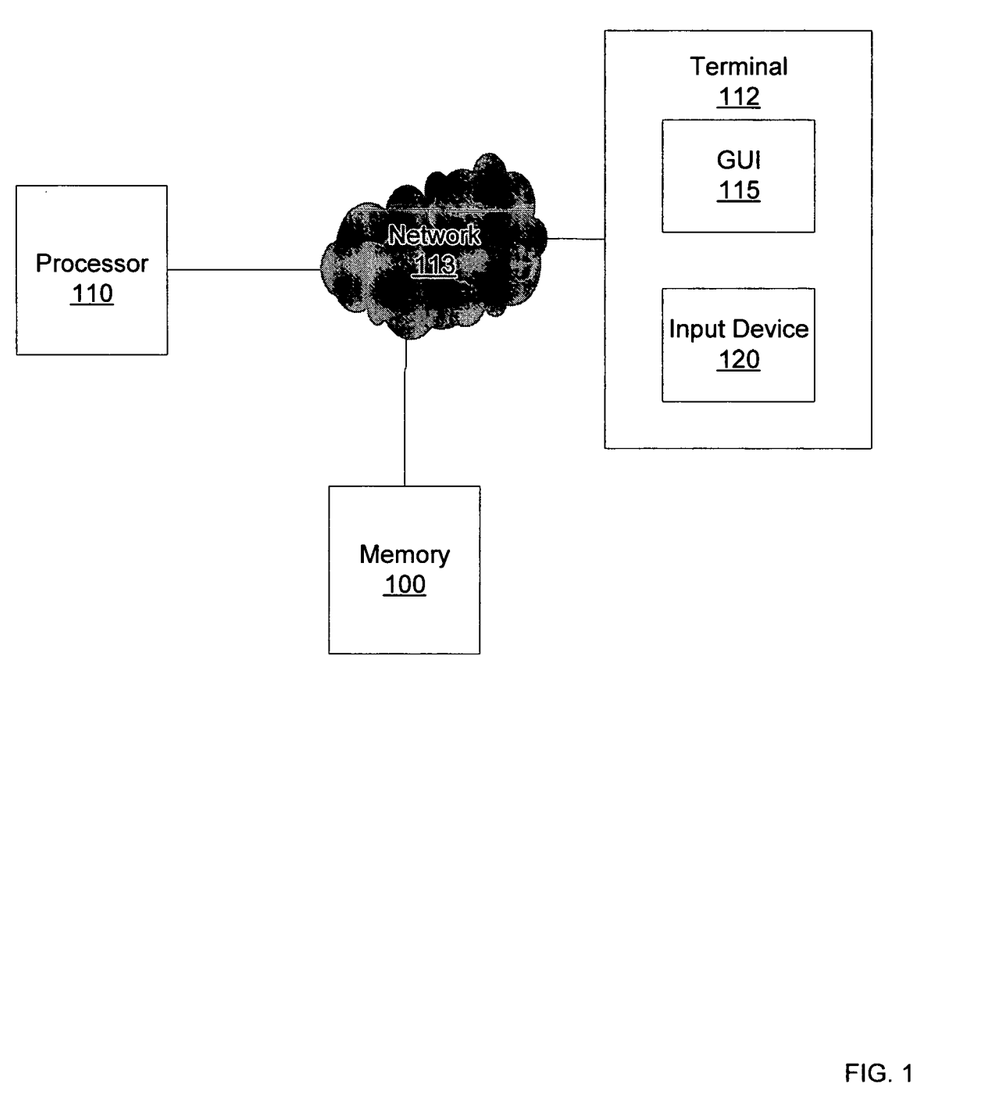
FIG. 1 is a block diagram that illustrates components of a conventional system for controlling document indexing for a search engine.

FIG. 1 is a block diagram that illustrates components of a conventional system in which document indexing for a search engine may be controlled. A search engine may implement a spider to retrieve documents, e.g., from the internet. Alternatively, a user may send documents to the search engine. The search engine may index the documents, e.g., based on terms within a document, the Uniform Resource Locator (URL) of the document, or any other conventional item upon which to base an index. The search engine may initially create multiple relatively small intermediate indices based on the documents. Each of the intermediate indices may correspond to a main index. Each intermediate index may be merged into its corresponding main index, e.g., at predetermined times and/or upon user initiation. The search engine may implement an administration tool to control the administration of the intermediate and main indices, the merging of the former into the latter, and the performance of operations upon the intermediate and main indices. The administration tool may also control the administration of queues of the documents to be indexed. A processor 110 may perform the tasks of the administration tool. For example, the processor 110 may store the intermediate and main indices, and the document queues, e.g., as files. The processor 110 may be in communication with a memory 100, e.g., via a network 113. Alternatively, the memory 100 may be a local memory area of the processor 110. The processor 110 may store the files in the memory 100.

The processor 110 may communicate with a terminal 112 via the network 113. Any conventional network may be used. Alternatively, the processor 110 may reside in the terminal 112. The processor 110 may provide a list of all of the items, or of those items that are of a particular category. For example, the processor 110 may display within a graphical user interface (GUI) 115 of the terminal 112 a list of, e.g., the main indices.

The processor 110 may, upon receiving a user-instruction, perform operations upon the listed items. For example, a user may indicate to the processor 110 an operation command via an input device 120 of terminal 112. The input device may be, e.g., a keyboard, a mouse, or any conventional input device. To indicate a command, the user may depress a command key or key-combination mapped to a particular operation. The indicated command may apply to items within an active frame, e.g., window, of the GUI 115. Alternatively, the processor 110 may display within the window of the GUI 115 that contains the list of items, a button for one or more operations that may be selected by a user for performance upon the items listed within the window. The user may select a button mapped to an operation via a mouse. Performance of the operation upon an item may be conditioned upon conformance of the item with predetermined parameters. In response to the user-instruction, the processor 110 may indicate which of the listed items conform to the predetermined parameters and which of the listed items do not conform to the predetermined parameters. For example, in response to the receiving the user-instruction, the processor 110 may display a flag column pertaining to the predetermined parameters and indicating whether the listed items conform to the parameters. Alternatively, the processor may display the flag column even before receiving the instruction and may highlight the previously displayed flag column in response to receiving the instruction. The processor 110 may subsequently or simultaneously perform the operation upon the conforming items.

Figure 2A:
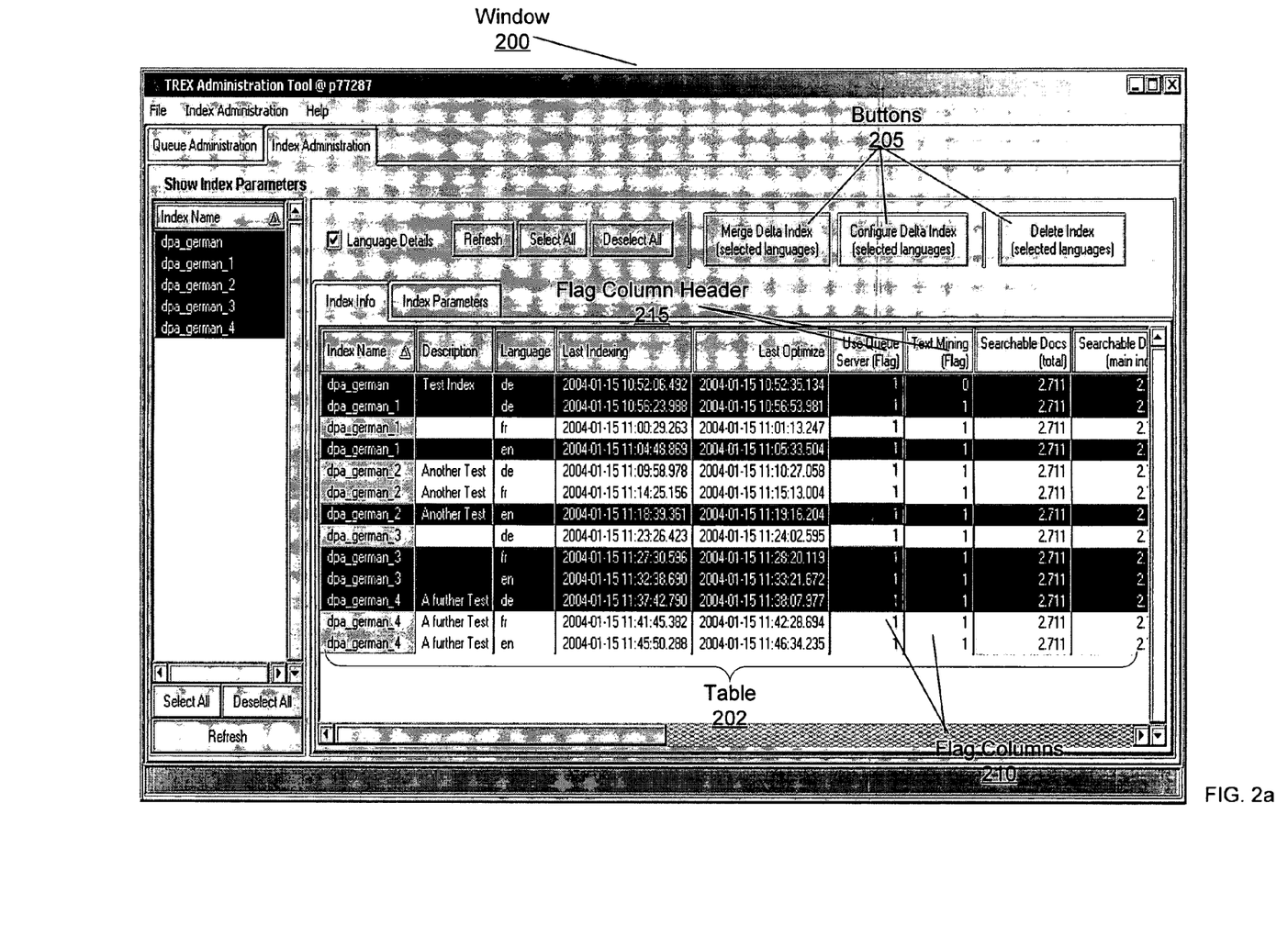
FIG. 2a is a screenshot of an example window before an instruction to perform an operation, according to an embodiment of the present invention.

FIG. 2a is a screenshot of an example window 200 of the GUI 115 of FIG. 1, according to an embodiment of the present invention. The window 200 may include a table 202 that lists items of the computer system. The items may be main indices. The window 200 may also include one or more operation buttons 205. Each button 205 may be mapped to an operation to be performed by the processor 110 of FIG. 1 upon the items listed in the table 202.

The table 202 may include flag columns 210. Performance of an operation upon an item may be conditioned upon conformance of the item with predetermined parameters. Such parameters may be the possession or non-possession of one or more characteristics. Alternatively, performance of an operation upon an item may be conditioned upon conformance of the item with one of a few particular combinations of parameters. For example, in one instance, an item may or may not possess each of four characteristics. Performance of an operation may be conditioned, for example, upon either possession of the first and the third characteristics, or otherwise, possession of the second and fourth characteristics. According to one embodiment of the present invention, the processor may include in the table a flag column for each item characteristic upon which may be based performance of an operation.

For example, some main indices may possess the characteristic that they use a queue, while other main indices may not possess this characteristic. Instead, intermediate indices of the other main indices may use the queue. A user may initiate the processor 110 to merge into main indices, i.e. items listed in table 202, their corresponding intermediate indices. Performance of this operation upon a listed main index may be conditioned by the administration tool upon the main index's non-possession of the queue-use characteristic. That is, performance of the operation may be conditioned upon the use of a queue by the intermediate indices of a main index, rather than by the main index itself. The administration tool may also condition performance of the operation upon the index's possession or non-possession of a second characteristic.

According to this embodiment, the processor 110 may include in table 202 two flag columns 210 for the merge indices operation. Data of one of the flag columns 210 may indicate whether or not listed main indices possess the queue-use characteristic. Data of the other of the flag columns 210 may indicate whether or not the listed main indices possess the second characteristic. The rows of the flag columns 210 may each correspond to a different one of the listed indices. The flag columns 210 may thereby convey to the user information about each of the items listed in the table 202. Based upon this information, the user can determine whether operations that may be performed upon the listed items, e.g., in response to a user-instruction, are applicable to particular items of the list.

The processor 110 may include for each displayed flag column 210 a flag column header 215. Data of the flag column header 215 may indicate the particular characteristic represented by the flag column header 215's corresponding flag column 210.

According to an alternative embodiment of the present invention, the processor 110 may include in table 202, at most, one flag column 210 for an operation. If performance of an operation is conditioned upon the possession or non-possession of more than one characteristic, processor 110 may include in table 202 a single flag column 210. Data of the single flag column 210 may indicate whether an item conforms to all the predetermined parameters for performance of the operation. If a particular item conforms to only one of two parameters, the flag column 210 may indicate the item's nonconformance to the predetermined parameters for performance of the operation. According to this embodiment, the processor 110 may include for each displayed flag column 210 a flag column header 215, the data of which may indicate the particular characteristic combination represented by the flag column header 215. Alternatively, data of the flag column header 215 may indicate the particular operation represented by the flag column 210, e.g., where no two operations share the same set of predetermined parameters upon which is conditioned performance of the operations.

According to an alternative embodiment of the present invention, for a particular operation, the processor 110 may include in table 202 one flag column 210 that may indicate whether an item conforms to all the predetermined parameters for performance of the operation, and may additionally include in table 202 a flag column 210 for each individual predetermined parameter.

According to an embodiment of the present invention, the processor 110 may include flag columns 210 to represent parameters of only a few select operations. For example, for a particular window 200, the processor 110 may include flag columns 210 for only those operations that are most frequently performed. Alternatively, for a particular window 200, the processor 110 may include flag columns 210 for only primary operations of the window 200. For example, primary operations to be performed upon items listed in an index administration window may be merge-index and/or delete-index operations.

According to an alternative embodiment of the present invention, the processor 110 may include flag columns 210 in the table 202 for only those operations for which a button 205 is included in the same window 200 in which is displayed the table 202.

According to an alternative embodiment of the present invention, the processor 110 may include flag columns 210 in the table 202 for all operations that may be performed upon items listed in the table 202.

In one embodiment of the present invention, data within a cell of a flag column 210 may be one of two characters. One of the characters may indicate a corresponding item's possession of a characteristic. The other of the characters may indicate a corresponding item's non-possession of the characteristic. For example, a 1 may indicate possession of a characteristic, and a 0 may indicate non-possession of the characteristic.

In an embodiment of the present invention, the two characters may be displayed in different colors. For example, a 1 may be displayed in red, and a 0 may be displayed in green. In one embodiment, the application of a color to a character of a flag column 210 may depend upon the particular characteristic and operation to which the flag column 210 corresponds. For example, performance of an operation may be conditioned upon the non-possession of a first characteristic and upon the possession of a second characteristic. The processor 110 may include in the table 202 a first flag column 210 that represents the first characteristic and a second flag column 210 that represents the second characteristic. A 1 may indicate an item's possession of a characteristic. A 0 may represent an item's non-possession of a characteristic. Since a 1 within the first column indicates the inapplicability of the operation to a corresponding item, the 1 may be displayed in red, and a 0 may be displayed in green. Since a 0 within the second column indicates the inapplicability of the operation to a corresponding item, the 0 may be displayed in red, and the 1 may be displayed in green.

In an embodiment of the present invention, the 0 and the 1 of a flag column 210 may both be initially displayed in a single color. Subsequently, after a user initiates the processor 110 to perform an operation to which the flag column 210 pertains, the color of either the 1s, the 0s, or both the 1s and the 0s of the flag column 210 may be changed so that the color of the 1s is different than the color of the 0s. For example, the 1s and the 0s may be initially displayed in white. After a user initiates the processor 110, the color of the 1s may be changed to red, and the color of the 0s may be changed to green. Alternatively, the is and 0s may both be initially displayed in red. After a user initiates the processor 110 to perform an operation, the color of the 0s may be changed to green.

In an embodiment of the present invention, characteristics represented by a flag column 210 may pertain to the performance of more than one operation. In one instance, a first operation may be conditioned upon the possession of a particular characteristic, and a second operation may be conditioned upon the non-possession of the same particular characteristic.

In this instance, according to one embodiment of the present invention, the 1s and 0s of the flag column 210 may be initially displayed in a single color. The color of the 1s and 0s may be subsequently changed depending on which of the two operations a user instructs the processor 110 to perform. For example, if the user instructs the processor 110 to perform the first operation, then the 1s may be displayed in green, and the 0s may be displayed in red. If the user instructs the processor 110 to perform the second operation, the 1s may be displayed in red, and the 0s may be displayed in green.

In an alternative embodiment of the present invention, data within a cell of a flag column 210 may be one or more values. For example, a flag column 210 may pertain to a frequency characteristic. Data of the flag column 210 may indicate a particular frequency, a range of frequencies, or several discrete frequencies associated with corresponding listed items. As an additional example, a flag column 210 may pertain to a color characteristic. In this instance, data of the flag column 210 may indicate a particular color or several discrete colors associated with corresponding listed items. According to this embodiment, when a listed item conforms to a particular parameter of an operation with which the flag column 210 pertains, data within the row of the flag column 210 that corresponds to the listed item may be displayed in green to indicate conformance of the listed item to at least the particular parameter. Otherwise, the data may be displayed in red. For example, if a range of frequencies of a listed item does not fall within a range of frequencies upon which is conditioned performance of an operation, the flag column may display in red the range of frequencies associated with the listed item.

In an embodiment of the present invention, a user may select particular items from the items listed in the table 202. The user may instruct the processor 110 to perform an operation upon only the selected items. Upon selection of an item, the processor 110 may highlight a row of the table 202 that corresponds to the selected item, as illustrated in FIG. 2a. Portions of the table 202 may be highlighted, e.g., with respect to color, and/or brightness.

Figure 2B:
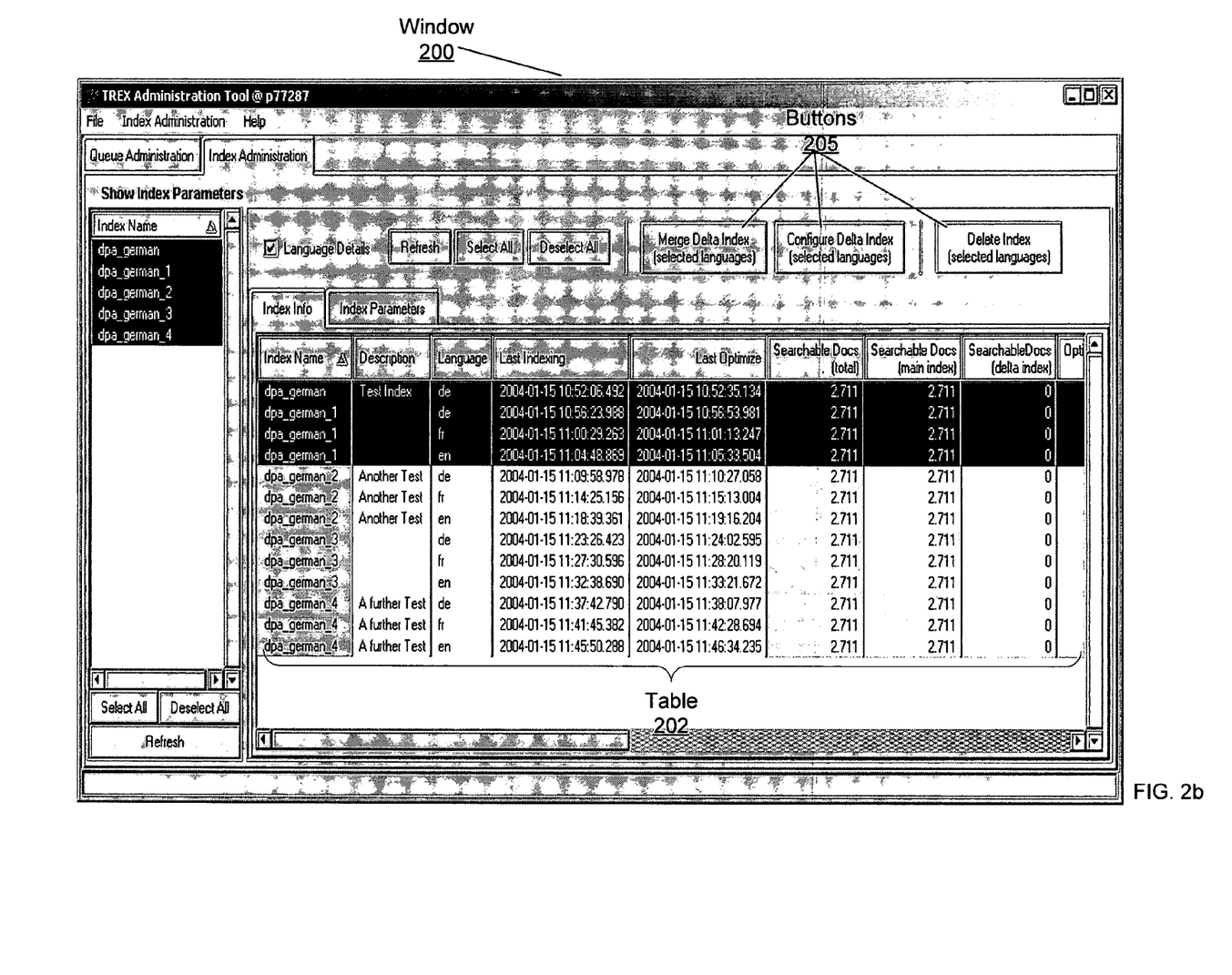
FIG. 2b is a screenshot of an example window before an instruction to perform an operation, according to an alternative embodiment of the present invention.

In an embodiment of the present invention, each flag column 210 may be displayed at all times as illustrated in FIG. 2a. In an alternative embodiment, a flag column 210 may be displayed only when an instruction to perform an operation is received, such that the flag column 210 pertains to parameters of the operation. According to this alternative embodiment, before a user instructs the processor 110 to perform an operation, the window 200 may be displayed as a conventional window 200 without flag columns, as illustrated in FIG. 2b.

In an embodiment of the present invention, the flag columns 210 may be highlighted to differentiate the flag columns 210 from other columns within the table 202. In one embodiment, the flag columns 210 may be so highlighted at all times. In an alternative embodiment, the flag columns 210 may be initially displayed in non-highlighted state. Subsequent to receiving an instruction to perform an operation, the processor 110 may highlight the flag columns 210. For example, the processor 110 may highlight all of the flag columns 210.

Figure 3:
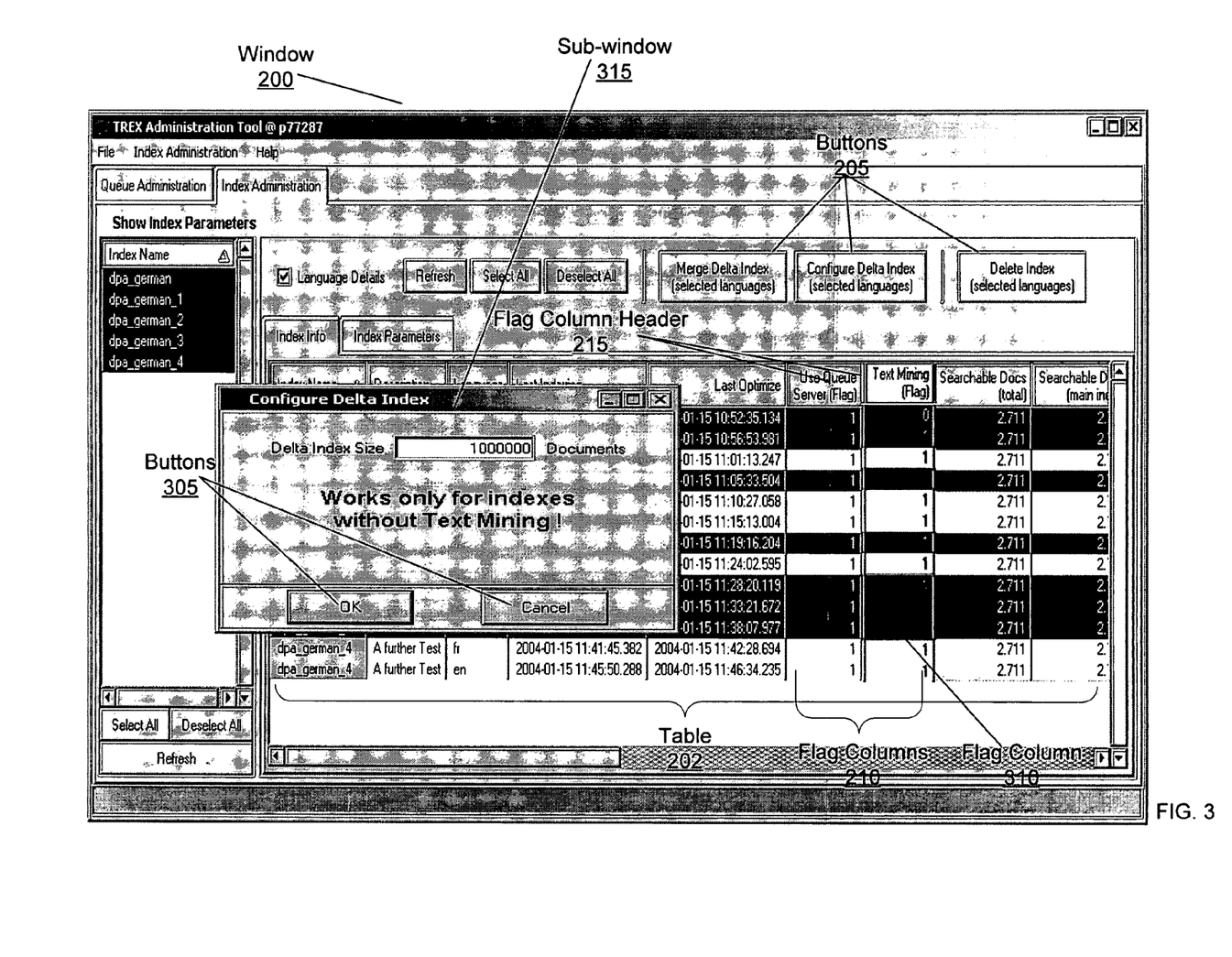
FIG. 3 is a screenshot of an example window after an instruction to perform an operation, according to an embodiment of the present invention.

FIG. 3 is a screenshot that illustrates the example window 200 of FIG. 2 after an instruction to perform an operation, according to an embodiment of the present invention. In one embodiment, after a user instructs the processor 110 to perform an operation, the processor 110 may highlight a particular flag column 310 only if the particular flag column pertains to parameters upon which is based performance of the indicated operation. For example, the processor 110 may highlight one or more flag columns 310 to draw a user's attention to those of the flag columns 210 that are relevant to the indicated operation.

In an embodiment of the present invention, for a highlighted flag column 310, the processor 110 may display the two possible characters in colors that have a high contrast to the background color of the highlighted flag column 310. For example a highlighted flag column 310 may have a dark background color. The processor 310 may display a 1 within a cell of the flag column 310 in bright green, and a 0 in bright red, both colors having a high contrast to the dark background color of the highlighted flag column 310.

In an embodiment of the present invention, in response to receiving a user-instruction to perform an operation, the processor 110 may display a message that indicates to the user the parameters upon which is based performance of the indicated operation. For example, the processor 110 may display the message in a sub-window 315. The sub-window 315 may be displayed anywhere within a display area of the GUI 115. In one embodiment, the sub-window 315 may be superimposed over a main window 200 in which is displayed the table 202.

In an embodiment of the present invention, the message may additionally indicate the number of selected items that conform to the parameters.

In an embodiment of the present invention, if selected items of the table 202 conform to the parameters upon which is based the indicated operation, the processor 110 may perform the indicated operation after displaying the message, e.g., in the sub-window 315. In one embodiment, the processor 110 may perform the operation without a further user prompt. In an alternative embodiment, after displaying the message, the processor 110 may perform the indicated operation only after receiving a further prompt by the user. For example, the processor 110 may display two buttons 305, e.g., in the sub-window 315. If the user selects one of the buttons 305, the processor 110 may proceed to perform the indicated operation. If the user selects the other of the buttons 305, the processor may cancel performance of the indicated operation. In this instance, the processor may again display window 200 in its pre-operation instruction state, for example, as illustrated in FIG. 2a or FIG. 2b.

Figure 4:
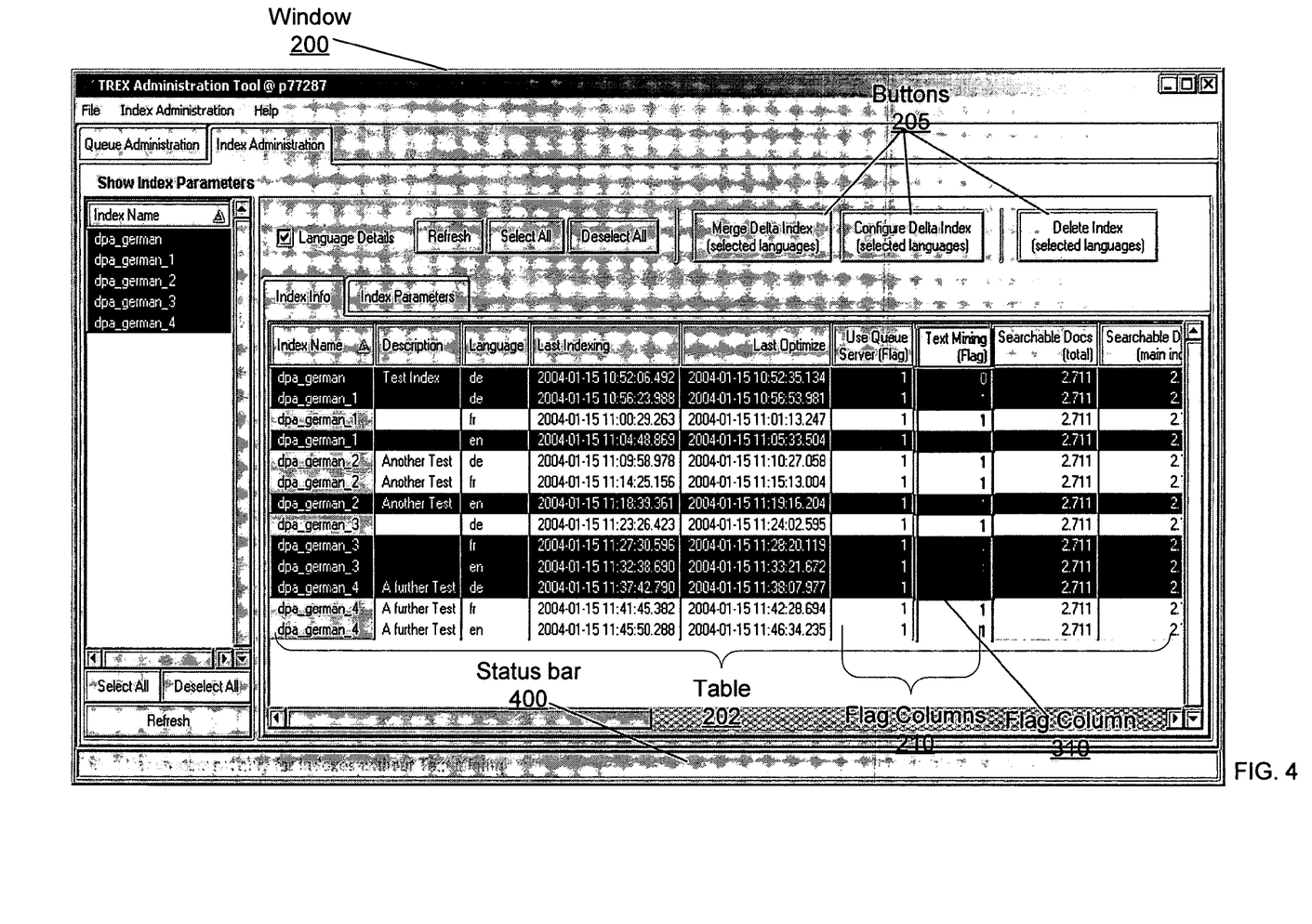
FIG. 4 is a screenshot of an example window after performance of an operation, according to an embodiment of the present invention.

FIG. 4 is a screenshot that illustrates the example window 200 of FIGS. 2a, 2b, and 3 after an operation has been performed, according to an embodiment of the present invention. After the processor 110 performs an operation upon one or more items of table 200, the processor 110 may display window 200 essentially as the window 200 is displayed in its pre-operation instruction state, but may further display a message, for example in a status bar 400. The message may identify the parameters upon which was based performance of the operation. The message may also indicate that the processor 110 performed the operation upon only those items, e.g., selected items, that conformed to the identified parameters at the time of performance of the operation. The status bar 400 may be displayed, for example, within the window 200 and below the table 202.

Figure 5:
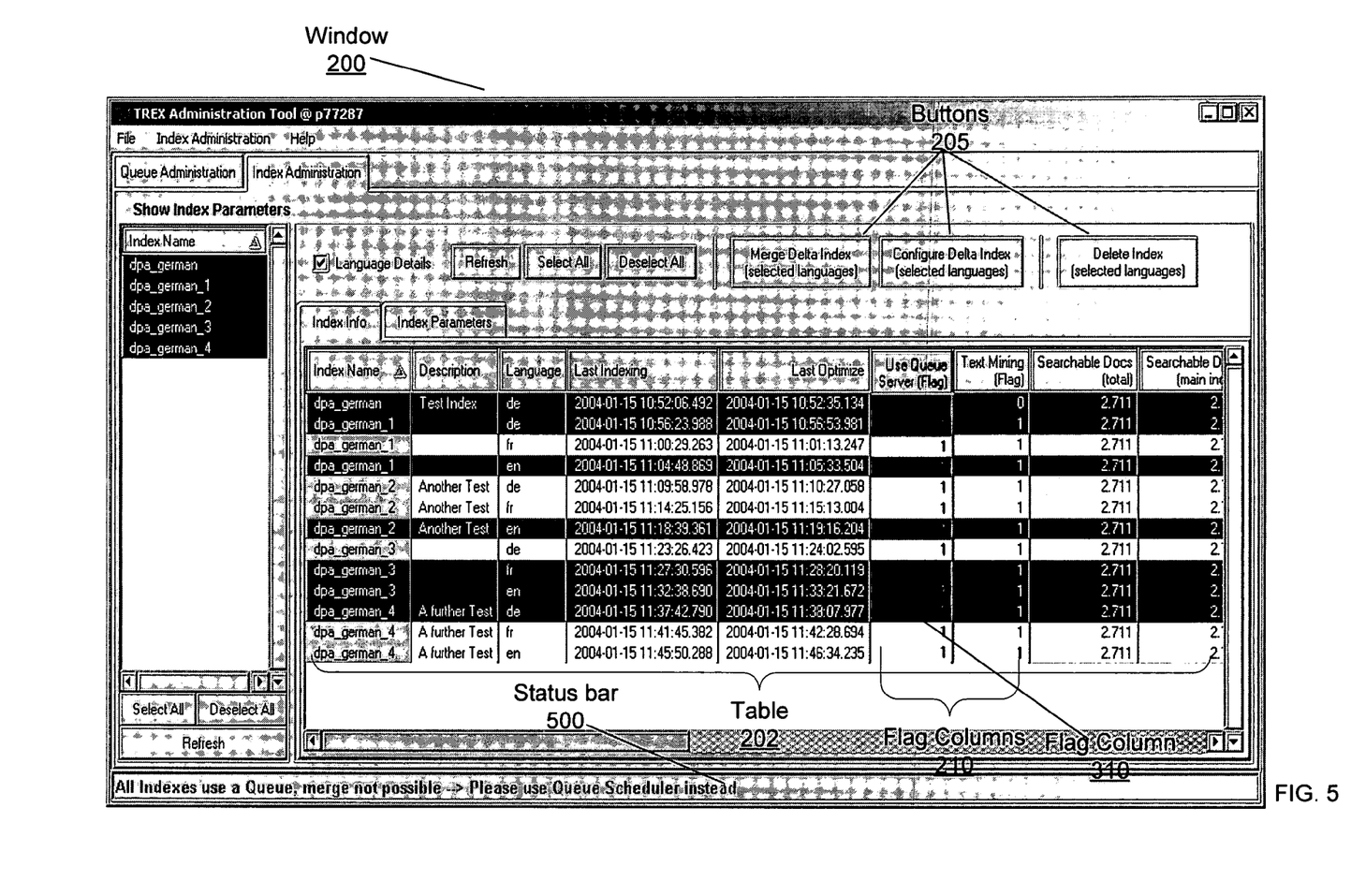
FIG. 5 is a screenshot of an example window after an instruction to perform a non-performable operation, according to an embodiment of the present invention.

FIG. 5 is a screenshot that illustrates the example window 200 of FIGS. 2a to 4 after an instruction to perform an operation, the performance of which is based upon parameters to which no selected items conforms, according to an embodiment of the present invention. A user may initiate the processor 110 to perform an operation, e.g., for selected items. Performance of the indicated operation may be based upon conformance of the selected items to a set of parameters. However, it may occur that none of the selected items conform to the set of parameters. In this instance, in one embodiment of the present invention, in response to the operation-instruction, the processor 110 may display window 200 essentially as the window 200 is displayed in its pre-operation-instruction state, but may further display a message, for example in a status bar 500. The message may indicate that the operation could not be performed. The message may also indicate the reason that the operation could not be performed, i.e. because no selected item conforms to predetermined parameters upon which is based performance of the operation. The message may further identify the predetermined parameters. Where some items conform to one parameter, but no selected item conforms to a second parameter, in one embodiment of the present invention, the message may identify the particular parameter to which no selected item conforms, i.e. the second parameter. The message may further suggest to a user an alternative operation that may be performed upon the selected items.

In an alternative embodiment of the present invention, in response to the operation-instruction, the processor 110 may display the window 200 as illustrated in FIG. 3, including the sub-window 315, even in an instance where no selected item conforms to parameters upon which is based performance of the indicated operation. After displaying the window 200 as illustrated in FIG. 3, the processor 110 may display the window 200 as illustrated in FIG. 5, including the message displayed in the status bar 500. For example, the processor 110 may display window 200 as illustrated in FIG. 5, only after a user inputs a further indication to proceed with the indicated operation, for example by selecting a button 305 of FIG. 3.

In an embodiment of the present invention, after the window 200 is displayed either as illustrated in FIG. 4 or as illustrated in FIG. 5, the processor 110 may again display the window 200 as in its pre-operation-instruction state. In one embodiment of the present invention, the processor may return the window 200 to its pre-operation-instruction state after the processor receives a user input, e.g., a mouse click or a key entry.

For example, a click of a mouse while the mouse pointer is anywhere within the display area of the GUI, e.g., when the window 200 is the active window, may suffice to return the window 200 to its pre-operation-instruction state. Where the window 200, is not the active window, a click of a mouse while the mouse pointer is anywhere within the window 200 may suffice, since the window 200 becomes the active window in response to the mouse click.

As an additional example, any key entry, e.g., while the window 200 is the active window, may suffice to return the window 200 to its pre-operation-instruction state.

Figure 6:
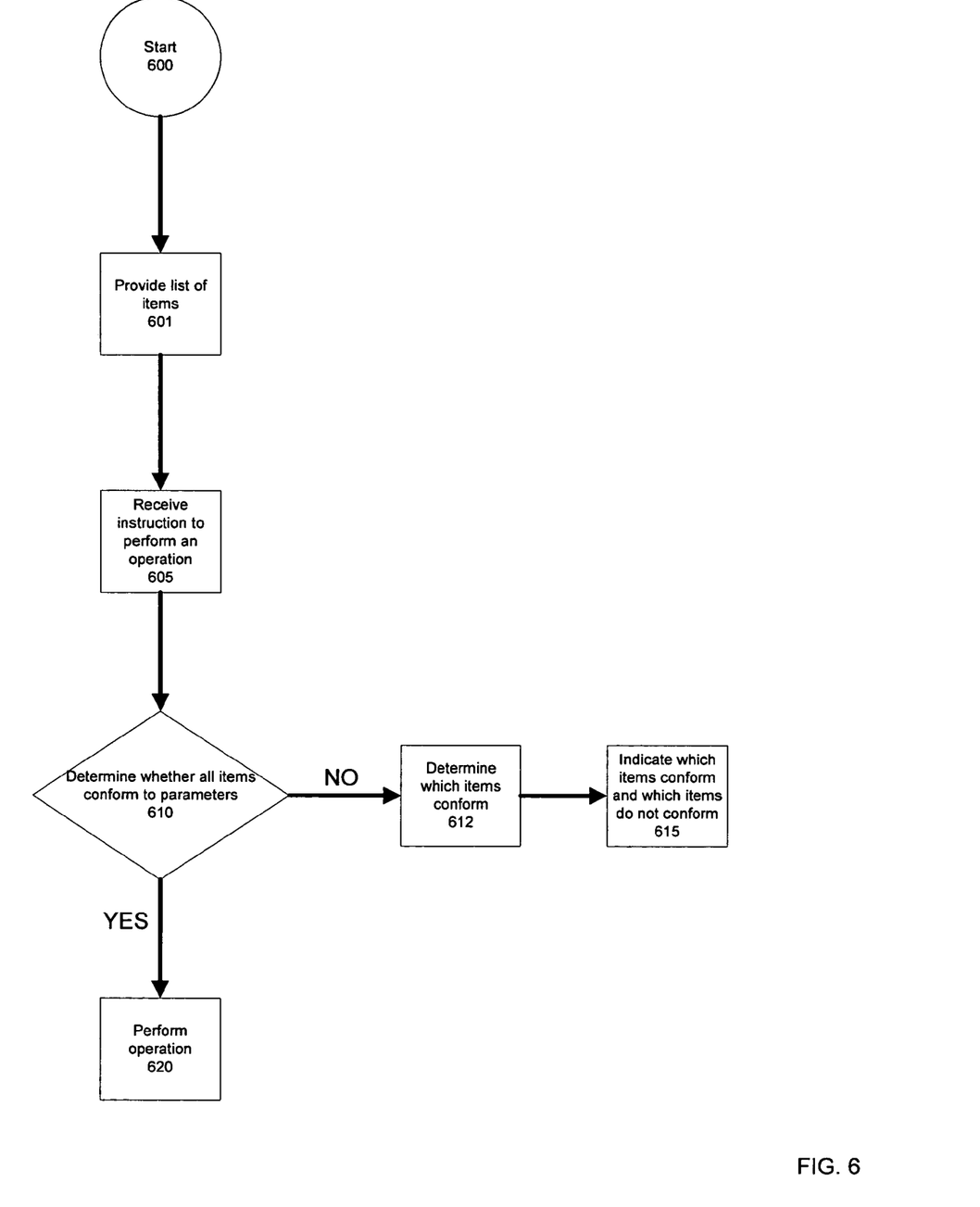
FIG. 6 is a flowchart that illustrates an example procedure in which to provide information about an operation's applicability to listed items, according to an embodiment of the present invention.

FIG. 6 is a flowchart that illustrates a procedure in which to provide to a user information about an operation's applicability to listed items, according to an embodiment of the present invention. In 600, a processor, e.g., executing a search engine administration tool program, may begin a procedure. In 601, the processor may provide a list of items. In 605, the processor may receive an instruction to perform an operation. In 610, the processor may determine whether all of the listed items conform to predetermined parameters upon which performance of the indicated operation is conditioned. If the processor determines that not all of the listed items conform to the predetermined parameters, the processor may, in 612, determine which of the listed items, if any, conform to predetermined parameters upon which performance of the indicated operation is conditioned. In alternative embodiment, the processor may make these determinations prior to receipt of the instruction in 605.

In one embodiment, if the processor determines that all of the listed items conform to the predetermined parameters, the processor may proceed directly to 620. In 620, the processor may perform the indicated operation upon those of the listed items that conform to the predetermined parameters. Otherwise, in 615, the processor may indicate to a user the predetermined parameters upon conformance to which is conditioned performance of the indicated operation, and may indicate which of the listed items conform to the predetermined parameters and which of the listed items do not conform to the predetermined parameters. In an alternative embodiment of the present invention, even if the processor determines that all of the listed items conform to the predetermined parameters, the processor may proceed to 615.

Figure 7A:
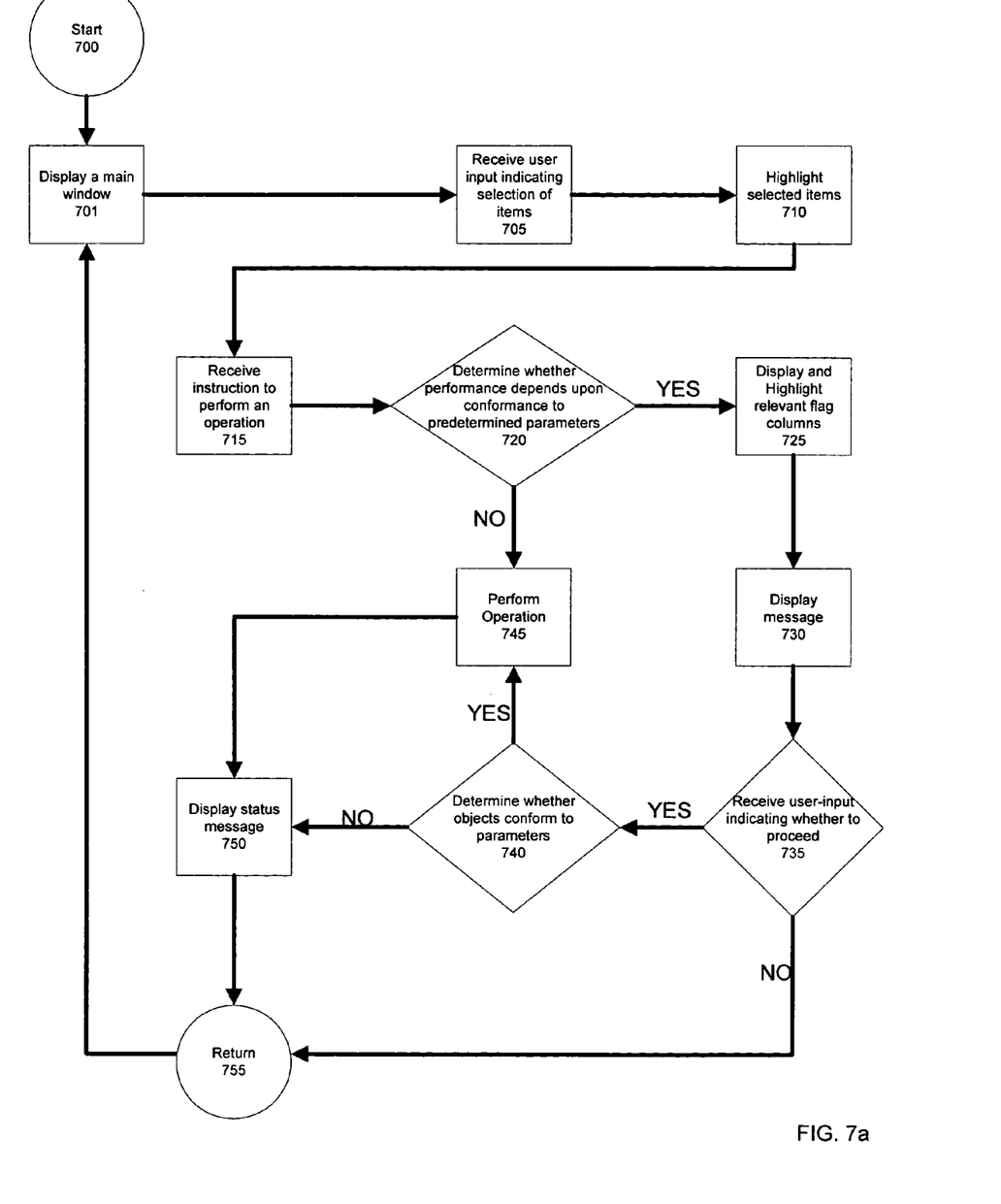
FIG. 7a is a flowchart that illustrates an example procedure in which to display flag columns to provide information about an operation's applicability to listed items, according to an embodiment of the present invention.

FIG. 7a is a flowchart that illustrates a procedure in which to display flag columns to provide to a user information about an operation's applicability to listed items, according to an embodiment of the present invention. In 700, a processor, e.g., executing a search engine administration tool program, may begin a procedure. In 701, the processor may display a main window, e.g., within a display area of a GUI. The window may include a list of items in a table format. The window may also include buttons that correspond to operations that may be performed upon the listed items. In 705, the processor may receive a user input that indicates a selection of a set of items from the list of items. In response to the selection, in 710, the processor may highlight the selected items.

In 715, the processor may receive user input, e.g., a mouse-click to select a button or a keyboard entry of a command key or key-combination, as an instruction to perform an operation upon the selected items. In response, in 720, the processor may determine whether performance of the indicated operation depends upon conformance of selected items to predetermined parameters. If the processor determines that the indicated operation does not depend upon conformance of items to predetermined parameters, the processor may, in 745, perform the operation. Otherwise, in one embodiment of the present invention, in 725, the processor may display and highlight flag columns that pertain to the predetermined parameters, and that include, e.g., one of two characters displayed in different colors to indicate the applicability or the inapplicability of the indicated operation to the items. For example, a character that indicates the operation's applicability may be displayed in green, and a character that indicates the operation's inapplicability may be displayed in red. The flag columns may be displayed in the table in which is listed the items.

In 730, the processor may display a message that identifies the predetermined parameters and that informs the user that the indicated operation will be performed upon only those selected items that conform to the predetermined parameters. The message may be displayed, e.g., in a sub-window. The sub-window may be superimposed over the main window. Alternatively, the sub-window may be displayed anywhere within the display area of the GUI. The processor may also include in the sub-window buttons to be selected by the user.

One button may be for proceeding with the operation. A second button may be for canceling the operation.

In 735, the processor may receive a user-input indicating whether to proceed with or cancel the indicated operation. If the operation is canceled, the processor may, in 755, return to 701. Otherwise, the processor may determine, in 740, whether any of the selected items conforms to the predetermined parameters. If one or more selected items conform to the predetermined parameters, in 745, the processor may perform the indicated operation upon those conforming selected items. Otherwise, the processor may, in 750, display a status message, e.g., in a status bar, that indicates that the operation has not been performed. The message may also indicate the reason the operation was not performed, and may suggest an alternative operation to be performed.

After performing the operation in 745, the processor may, in 750 display a status message that identifies the predetermined parameters and that indicates that the operation was performed upon only those selected items that, at the time of operation performance, conformed to the predetermined parameters.

After displaying the status message, the processor may, in 755, return to 701.

Figure 7B:
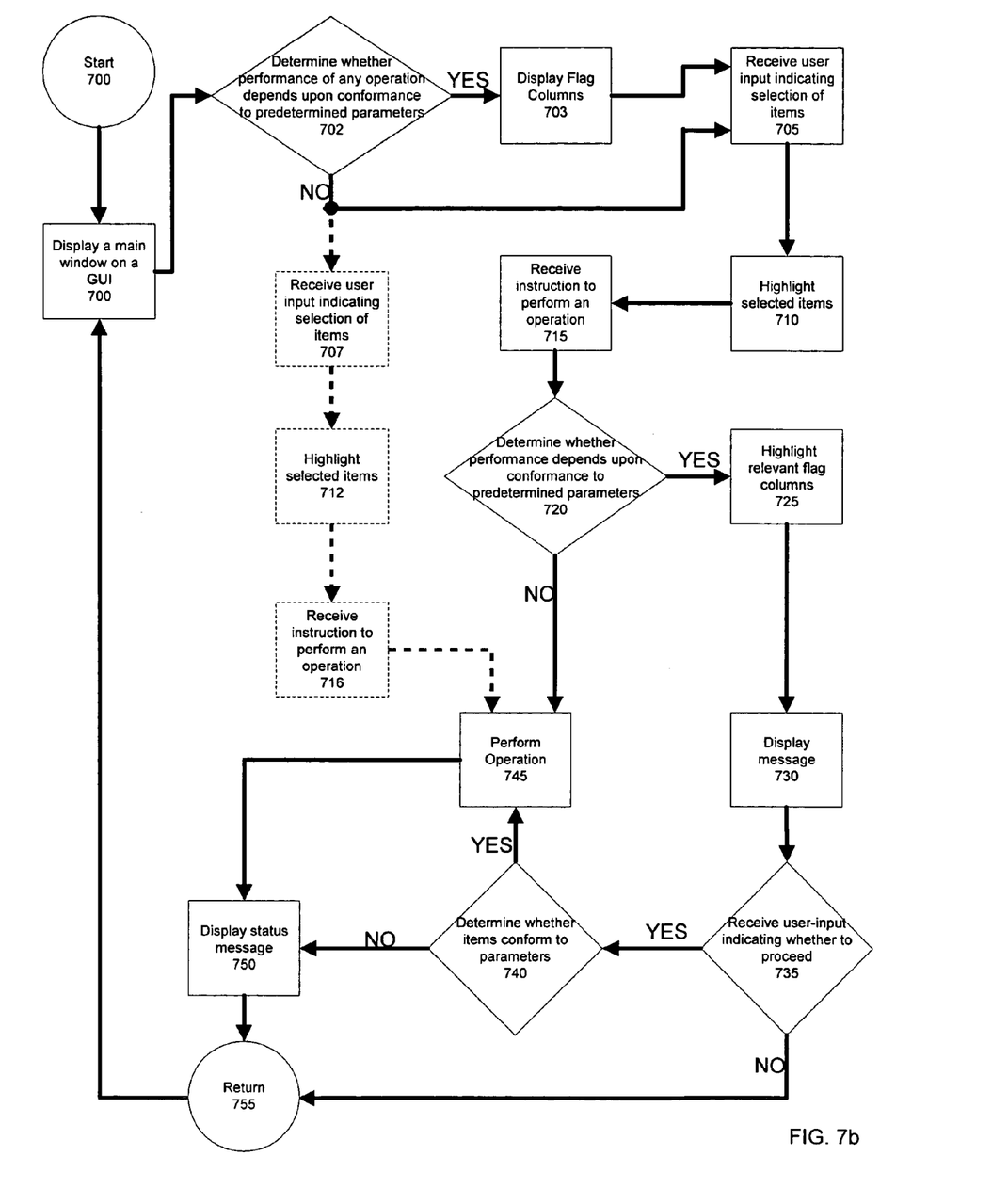
FIG. 7b is a flowchart that an example procedure in which to display flag columns to provide information about an operation's applicability to listed items, according to an alternative embodiment of the present invention.

FIG. 7b is a flowchart that illustrates a procedure in which to provide to a user information about an operation's applicability to listed items, according to an alternative embodiment of the present invention. According to this embodiment, after displaying the main window, including the table of items, the processor, in 702, may determine whether performance of any operation that may be performed upon selected items of the table depends upon conformance of those selected items to predetermined parameters. If performance of one or more operations depends upon conformance of items to predetermined parameters, the processor may, in 703, display flag columns that pertain to the predetermined parameters, and then proceed to 705. Otherwise, in one embodiment of the present invention, the processor may proceed directly to 705. In 705 to 755, the processor may proceed essentially as described with respect to FIG. 7a, except that in 725 the processor may be required only to highlight the relevant flag columns since the processor already displayed the flag columns in 703.

In an alternative embodiment of the present invention, after the processor, in 702, determines that no operation's performance depends upon conformance of selected items to predetermined parameters, the processor may proceed to 707. In 707 to 716, the processor may proceed as described with respect to 705 to 715. However, after 716, in which the processor may receive a user instruction to perform an operation upon the selected items, the processor may proceed directly to 745, since it has already been determined that no operation's performance depends upon conformance of items to predetermined parameters.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A system for performing item operations, comprising:
  a graphical user interface (GUI); and
  a processor configured to display in a display area of the GUI:
    a button that corresponds to an operation, the operation to be performed one of on and for a particular item upon a first condition that the particular item conforms to a predetermined parameter; and
    a table that includes a list of a plurality of items and a flag column that is presented in response to a selection of the button;
      wherein data of a particular row of the flag column indicates whether a corresponding item of the particular row conforms to the predetermined parameter.

2. The system of claim 1, wherein the flag column is highlighted to create a contrast between the flag column and a remaining part of the table.

3. The system of claim 2, wherein the flag column is highlighted in response to the selection of the button.

4. The system of claim 1, wherein:
  the predetermined parameter is one of a presence and an absence of a characteristic; and
  the data is one of a first character that indicates the presence of the characteristic and a second character that indicates the absence of the characteristic.

5. The system of claim 4,
  wherein the data is displayed in a first color if the particular row's corresponding item conforms to the predetermined parameter, and
  wherein the data is otherwise displayed in a second color.

6. The system of claim 4, wherein a header corresponding to the flag column is displayed, and wherein contents of the header identify the characteristic.

7. The system of claim 1,
  wherein the operation is performed on the particular item upon a second condition that the particular item is selected, and
  wherein the particular item is highlighted when selected.

8. The system of claim 7, wherein a set of the plurality of items is simultaneously selectable.

9. The system of claim 1,
  wherein the predetermined parameter includes a first parameter and a second parameter, and
  wherein the flag column includes a first flag column that corresponds to the first parameter and a second flag column that corresponds to the second parameter.

10. The system of claim 1, wherein, upon the selection of the button, a message that indicates the first condition is displayed.

11. The system of claim 1, wherein subsequent to performance of the operation, a status message is displayed.

12. The system of claim 1, wherein the processor is further configured to:
  determine, subsequent to the selection of the button, whether any of the plurality of items conforms to the predetermined parameter; and
  upon a determination that no item of the plurality of items conforms to the predetermined parameter, to display a status message.

13. The system of claim 1,
  wherein each item represents a main index maintained by an administration tool of a search engine, and
  wherein the operation is a merger of a sub-index of the particular item into the particular item.

14. A method for performing item operations, comprising:
  displaying a table that includes a list of a plurality of items;
  displaying a selectable button that corresponds to an operation to be performed one of on and for a particular item upon a first condition that the particular item conforms to a predetermined parameter; and in response to a selection of the button, displaying in the table a flag column,
wherein data of a particular row of the flag column indicates whether a corresponding item of the particular row conforms to the predetermined parameter.

15. The method of claim 14, further comprising:
highlighting the flag column to create a contrast between the flag column and a remaining part of the table.

16. The method of claim 15, wherein the flag column is highlighted in response to the selection of the button.

17. The method of claim 14, wherein:
the predetermined parameter is one of a presence and an absence of a characteristic; and
the data is one of a first character that indicates the presence of the characteristic and a second character that indicates the absence of the characteristic.

18. The method of claim 17, wherein the data is displayed in a first color if the particular row's corresponding item conforms to the predetermined parameter, and wherein the data is otherwise displayed in a second color.

19. The method of claim 17, further comprising:
displaying a header corresponding to the flag column, wherein contents of the header identify the characteristic.

20. The method of claim 14, wherein the operation is performed on the particular item upon a second condition that the particular item is selected, further comprising:
highlighting the particular item when the particular item is selected.

21. The method of claim 20, wherein a set of the plurality of items is simultaneously selectable.

22. The method of claim 14,
wherein the predetermined parameter includes a first parameter and a second parameter, and
wherein the flag column includes a first flag column that corresponds to the first parameter and a second flag column that corresponds to the second parameter.

23. The method of claim 14, further comprising:
upon the selection of the button, displaying a message that indicates the first condition.

24. The method of claim 14, further comprising:
subsequent to performance of the operation, displaying a status message.

25. The method of claim 14, further comprising:
subsequent to the selection of the button, determining whether any of the plurality of items conforms to the predetermined parameter; and
upon determining that no item of the plurality of items conforms to the predetermined parameter, displaying a status message.

26. The method of claim 14,
wherein each item represents a main index maintained by an administration tool of a search engine, and
wherein the operation is a merger of a sub-index of the particular item into the particular item.

27. An article of manufacture comprising a non-transitory computer-readable medium having stored thereon instructions adapted to be executed by a processor, the instructions which, when executed, define a method for performing item operations, the method comprising:
displaying a table that includes a list of a plurality of items;
displaying a selectable button that corresponds to an operation to be performed one of on and for a particular item upon a first condition that the particular item conforms to a predetermined parameter; and
in response to a selection of the button, displaying in the table a flag column, wherein data of a particular row of the flag column indicates whether a corresponding item of the particular row conforms to the predetermined parameter.

28. A method for performing item operations, comprising:
displaying a first table that includes a list of a plurality of items and, for an operation that is performed for a particular item upon a condition that the particular item conforms to a predetermined parameter, a flag column that indicates which items conform to the predetermined parameter;
upon receiving a command to perform the operation:
highlighting the flag column; and
displaying a message indicating the condition;
upon receiving a command to proceed, determining whether any of the plurality of items conforms to the predetermined parameter;
upon a determination that at least one item conforms to the predetermined parameter, performing the operation for the at least one item;
upon a determination that no item conforms to the parameter, displaying a status message; and
subsequent to performing the operation, displaying the status message.

29. A method, comprising:
displaying a table that includes a list of a plurality of items;
in response to receiving a command to perform an operation on the items, displaying in the table a flag column that, for each of the plurality of items, indicates whether the item conforms to a parameter upon which is conditioned performance of the operation,
wherein the plurality of items includes items that conform to the parameter and items that do not conform to the parameter.

30. A method, comprising:
displaying a table that includes a list of a plurality of items, an operation selectable for performance on the items, the operation performable on a particular item upon a condition that the particular item conforms to a predetermined parameter;
displaying in the table a flag column, data of a particular row of the flag column indicating whether a corresponding item of the particular row conforms to the predetermined parameter; and
upon selection of the operation, highlighting the flag column.

31. A system for performing item operations, comprising:
a graphical user interface (GUI); and
a processor configured to display in a display area of the GUI:
a button that corresponds to an operation, the operation to be performed one of on and for a particular item upon a condition that the particular item conforms to at least one predetermined parameter; and
a table that includes a list of a plurality of items and at least one flag column that is presented in response to a selection of the button;
wherein data of a particular row of the at least one flag column indicates whether a corresponding item of the particular row one of conforms to the at least one predetermined parameter and conforms to a particular one of the at least one predetermined parameter.

* * * * *